United States Patent
Etchegoyen

(10) Patent No.: US 9,578,502 B2
(45) Date of Patent: Feb. 21, 2017

(54) DEVICE AUTHENTICATION USING INTER-PERSON MESSAGE METADATA

(71) Applicant: Uniloc Luxembourg S.A., Luxembourg (LU)

(72) Inventor: Craig S. Etchegoyen, Plano, TX (US)

(73) Assignee: Uniloc Luxembourg S.A., Luxembourg (LU)

( * ) Notice: Subject to any disclaimer, the term of this patent is extended or adjusted under 35 U.S.C. 154(b) by 69 days.

(21) Appl. No.: 14/196,083

(22) Filed: Mar. 4, 2014

(65) Prior Publication Data
US 2014/0310774 A1 Oct. 16, 2014

Related U.S. Application Data

(60) Provisional application No. 61/811,066, filed on Apr. 11, 2013.

(51) Int. Cl.
*H04L 29/00* (2006.01)
*H04W 12/06* (2009.01)
*H04L 29/06* (2006.01)

(52) U.S. Cl.
CPC .......... *H04W 12/06* (2013.01); *H04L 63/0876* (2013.01)

(58) Field of Classification Search
CPC combination set(s) only.
See application file for complete search history.

(56) References Cited

U.S. PATENT DOCUMENTS

| | | |
|---|---|---|
| 4,118,789 A | 10/1978 | Casto et al. |
| 4,319,085 A | 3/1982 | Welch et al. |
| 4,658,093 A | 4/1987 | Hellman |
| 4,885,778 A | 12/1989 | Weiss |
| 5,291,598 A | 3/1994 | Grundy |
| 5,490,216 A | 2/1996 | Richardson, III |
| 6,158,005 A | 12/2000 | Bharathan et al. |
| 6,233,567 B1 | 5/2001 | Cohen |
| 6,243,468 B1 | 6/2001 | Pearce et al. |
| 6,536,005 B1 | 3/2003 | Augarten |

(Continued)

FOREIGN PATENT DOCUMENTS

| | | |
|---|---|---|
| EP | 1 455 258 | 9/2004 |
| EP | 1 637 958 | 3/2006 |

(Continued)

OTHER PUBLICATIONS

Beverly, Robert, "A Robust Classifier for Passive TCP/IP Fingerprinting," *Proceedings of the 5th Passive and Active Measurement Workshop*, Apr. 2004, Juan-les-Pins, France, pp. 158-167.

(Continued)

*Primary Examiner* — Ghazal Shehni
(74) *Attorney, Agent, or Firm* — Sean D. Burdick

(57) ABSTRACT

A device authentication server authenticates a remotely located device using unique data associated with the user of the device stored on a remotely located server that has an established relationship with the device, such as client logic installed on the device and authentication data of the user stored on the device. The unique data can be unique meta-data associated with inter-person messages. Since each user receives and sends a unique collection of messages, the unique message meta-data associated with a user's account is, in aggregate, unique.

15 Claims, 10 Drawing Sheets

(56) References Cited

U.S. PATENT DOCUMENTS

| | | | |
|---|---|---|---|
| 7,017,044 | B1 | 3/2006 | Carpenter et al. |
| 7,111,167 | B1 | 9/2006 | Yeung et al. |
| 7,181,195 | B2 | 2/2007 | Booth et al. |
| 7,188,241 | B2 | 3/2007 | Cronce et al. |
| 7,272,728 | B2 | 9/2007 | Pierson et al. |
| 7,302,590 | B2 | 11/2007 | Dublish et al. |
| 7,319,987 | B1 | 1/2008 | Hoffman et al. |
| 7,420,474 | B1 | 9/2008 | Elks et al. |
| 7,428,587 | B2 | 9/2008 | Rowland et al. |
| 7,463,945 | B2 | 12/2008 | Kiesel et al. |
| 7,617,231 | B2 | 11/2009 | Moon et al. |
| 7,779,274 | B2 | 8/2010 | Dublish et al. |
| 7,934,250 | B2 | 4/2011 | Richardson, III |
| 7,970,946 | B1 | 6/2011 | Djabarov et al. |
| 8,584,114 | B2 | 11/2013 | Rabinovich et al. |
| 2003/0008668 | A1 | 1/2003 | Perez-Breva et al. |
| 2003/0097562 | A1 | 5/2003 | Wheeler et al. |
| 2004/0030901 | A1 | 2/2004 | Wheeler et al. |
| 2004/0062084 | A1 | 4/2004 | Layman et al. |
| 2004/0122931 | A1 | 6/2004 | Rowland et al. |
| 2004/0254890 | A1 | 12/2004 | Sancho et al. |
| 2005/0033833 | A1 | 2/2005 | Baldiga et al. |
| 2005/0050531 | A1 | 3/2005 | Lee |
| 2006/0181394 | A1 | 8/2006 | Clarke |
| 2006/0200672 | A1 | 9/2006 | Calhoon et al. |
| 2006/0230317 | A1 | 10/2006 | Anderson |
| 2006/0274753 | A1 | 12/2006 | Park et al. |
| 2007/0113090 | A1 | 5/2007 | Villela |
| 2007/0136726 | A1 | 6/2007 | Freeland et al. |
| 2007/0143073 | A1 | 6/2007 | Richardson et al. |
| 2007/0234427 | A1 | 10/2007 | Gardner et al. |
| 2010/0235241 | A1 | 9/2010 | Wang et al. |
| 2012/0030771 | A1 | 2/2012 | Pierson et al. |
| 2012/0215896 | A1 | 8/2012 | Johannsen |
| 2012/0324581 | A1 | 12/2012 | Economos, Jr. et al. |
| 2014/0013108 | A1* | 1/2014 | Pellikka et al. ............. 713/156 |

FOREIGN PATENT DOCUMENTS

| | | |
|---|---|---|
| GB | 2434724 | 8/2007 |
| WO | WO 2006/089352 | 8/2006 |
| WO | WO 2008/127431 | 10/2008 |
| WO | WO 2009/024913 | 2/2009 |
| WO | WO 2011/147845 | 1/2011 |
| WO | WO 2011/147845 | 5/2011 |

OTHER PUBLICATIONS

Eckersley, Peter, "How Unique is Your Web Browser?" *Lecture Notes in Computer Science*, Jul. 21, 2010, DOI: 10.1007/978-3-542-14527-8_1, pp. 1-18.

Fink, Russ, "A Statistical Approach to Remote Physical Device Fingerprinting," *Military Communications Conference*, Oct. 29, 2007. (Abstract only).

G. Wiesen, "What is a Device Fingerprint?" *WiseGeek*, 2003, Internet article retrieved Dec. 17, 2011.

Heydt-Benjamin, T. S., "Ultra-low-cost True Randomness and Physical Fingerprinting," *Cryptocracy*, Sep. 10, 2007.

Franklin, Jason et al. "Passive data link layer 802.11 wireless device driver fingerprinting." Proc. 15th USENIX Security Symposium, pp. 167-178, Jul.-Aug. 2006.

Johnson et al. "Dimensions of Online Behavior: Toward a User Typology," *Cyberpsychology and Behavior*, vol. 10, No. 6, pp. 773-779, Dec. 2007. XP002617349.

Khanna et al. "A Survey of Forensic Characterization Methods for Physical Devices," *Science Direct*, Jun. 14, 2006, p. 17-28.

Kohno et al., "Remote Physical Device Fingerprinting," *IEEE Transactions on Dependable and Secure Computing*, vol. 2, No. 2, Apr.-Jun. 2005, pp. 93-108.

Lallous, "Changing Volume's Serial Number," Code Project Feb. 17, 2008, retreived from the internet on Dec. 14, 2010. XP002614149.

Lee P, "Oracle Adaptive Access Manager Reference Guide, Release 10g (10.1.4.5)," May 2009, Internet Article retrieved on Sep. 27, 2010. XP002603489.

Martone et al., "Characterization of RF Devices Using Two-tone Probe Signals," School of Electrical and Computer Engineering, Purdue University, West Lafayette, Indiana, Aug. 26, 2007.

Microsoft, "Using Intelligence and Forensics to Protect Against Counterfeit Intelligence," *Research and Development Industry Report*, Apr. 20, 2010, 1 page.

Muncaster et al., "Continuous Multimodal Authentication Using Dynamic Baysian Networks," Second Workshop on Multimodal User Authentication, Toulouse, France, May 11, 2006. XP55003041.

Salo, Timothy J., "Multi-Factor Fingerprints for Personal Computer Hardware," Military Communications Conference, Piscataway, New Jersey, Oct. 29, 2007, 7 pages. XP031232751.

SecuTech Solution, Inc., "Machine Fingerprint SDK", Aug. 2006, 4 pages.

Smolens et al., "Detecting Emerging Wearout Faults," *In Proceedings of the IEEE Workshop on Silicon Errors in Logic—System Effects*, Apr. 2007, Internet Article retrieved on Sep. 30, 2010. XP002603491.

Wikipedia: "Device Fingerprint," May 5, 2009, modified Jan. 20, 2011, Internet Article retrieved on Apr. 19, 2011. XP-002603492.

Wikipedia: "Software Extension," May 28, 2009, Internet Article retrieved on Oct. 11, 2010. XP002604710.

Williams, R., "A Painless Guide to CRC Error Detection Algorithms," Aug. 13, 1993, 33 pages, www.ross.net/crc/download/crc_v3.txt.

Williath, "Future Grid Portal," *VampirTrace*, Dec. 23, 2010.

Kobsa et al., "Personalised Hypermedia Presentation Techniques for Improving Online Customer Relationships," *The Knowledge Engineering Review*, © Cambridge University Press, United Kingdom, vol. 16, No. 2, 2001, pp. 111-155.

"Uniloc Addresses $40 Billion Piracy Challenge with First Global Piracy Auditing Solution as Part of New Software Copy Control Product Suite," *Product News Network*, © Thomas Publishing Company, Jul. 10, 2007, 2 pages.

Transcript from CBS Corp New, UBS Global Media Conference on Dec. 3, 2007 with Dave Poltrack by Matt Coppett, 9 pages.

Gassend et al., "Silicon Physical Random Functions" *ACM Conference on Computer and Communications*, Washington, D.C., Nov. 18-22, 2002, pp. 148-160.

* cited by examiner

DEVICE AUTHENTICATION USING INTER-PERSON MESSAGE METADATA

This application claims priority to U.S. Provisional Application 61/811,066, filed Apr. 11, 2013, which is fully incorporated herein by reference.

BACKGROUND OF THE INVENTION

1. Field of Invention

The present invention relates generally to network-based computer security and, more particularly, methods of and systems for authenticating a device for computer network security.

2. Description of the Related Art

Device identification through digital fingerprints has proven to be invaluable in recent years to such technologies as security and digital rights management. In security, authentication of a person can be restricted to a limited number of previously authorized devices that are recognized by their digital fingerprints. In digital rights management, use of copyrighted or otherwise proprietary subject matter can be similarly restricted to a limited number of previously authorized devices that are recognized by their digital fingerprints.

Digital fingerprints are particularly useful in uniquely identifying computing devices that are historically know as "IBM PC compatible". Such devices have an open architecture in which various computer components are easily interchangeable with compatible but different components. There are two primary effects of such an open architecture that facilitate device identification through digital fingerprints.

The first facilitating effect is diversity of device components. Since numerous components of IBM PC compatible devices are interchangeable with comparable but different components, generation of a digital fingerprint from data associated with the respective components of the device are more likely to result in a unique digital fingerprint.

The second facilitating effect is discoverability of details of the various components of IBM PC compatible devices. Since the particular combination of components that make up a given device can vary widely and can come from different manufacturers, the components and the operating system of the device cooperate to provide access to detailed information about the components. Such information can include serial numbers, firmware version and revision numbers, model numbers, etc. This detailed information can be used to distinguish identical components from the same manufacturer and therefore improves uniqueness of digital fingerprints of such devices.

Laptop computing devices evolved from desktop computing devices such as IBM PC compatible devices and share much of the architecture of desktop computing devices, albeit in shrunken form. Accordingly, while users are much less likely to replace graphics circuitry in a laptop device and components therefore vary less in laptop devices, laptop devices still provide enough detailed and unique information about the components of the laptop device to ensure uniqueness of digital fingerprints of laptop devices.

However, the world of computing devices is rapidly changing. Smart phones that fit in one's pocket now include processing resources that were state of the art just a few years ago. In addition, smart phones are growing wildly in popularity. Unlike tablet computing devices of a decade ago, which were based on laptop device architectures, tablet devices available today are essentially larger versions of smart phones.

Smart phones are much more homogeneous than older devices. To make smart phones so small, the components of smart phones are much more integrated, including more and more functions within each integrated circuit (IC) chip. For example, while a desktop computing device can include graphics cards and networking cards that are separate from the CPU, smart phones typically have integrated graphics and networking circuitry within the CPU. Furthermore, while desktop and laptop devices typically include hard drives, which are devices rich with unique and detailed information about themselves, smart phones often include non-volatile solid-state memory, such as flash memory, integrated within the CPU or on the same circuit board as the CPU. Flash memory rarely includes information about the flash memory, such as the manufacturer, model number, etc.

Since these components of smart phones are generally tightly integrated and not replaceable, the amount and variety of unique data within a smart phone that can be used to generate a unique digital fingerprint is greatly reduced relative to older device architectures. In addition, since it is not expected that smart phone components will ever be replaced, there is less support for access to detailed information about the components of smart phones even if such information exists.

Accordingly, it is much more difficult to assure that digital fingerprints of smart phones and similar portable personal computing devices such as tablet devices are unique. What is needed is a way to uniquely identify individual devices in large populations of homogeneous devices.

SUMMARY OF THE INVENTION

In accordance with the present invention, a device authentication server authenticates a remotely located device using data uniquely associated with the user of the device stored on a remotely located server that has an established relationship with the device. The established relationship can be client logic installed on the device and authentication data of the user stored on the device. As such, the remotely located device can be directed to access data associated with the user from the remotely located server without requiring intervention by the user.

For example, the remotely located server can provide a social networking server in which inter-person messages are associated with unique metadata to distinguish otherwise indistinguishable messages. Since each user receives and sends a unique collection of messages, the unique message metadata associated with a user's account is, in aggregate, unique.

By combining unique data associated with the user with internal attributes of the remotely located device, the device can be distinguished from similar devices when internal attributes alone are insufficient to uniquely identify the device.

For registration for subsequent authentication of the device, the device provides the device authentication server with data representing a relatively complete set of message metadata, sometimes referred to tag data, that the device retrieves from the remotely located server. The device authentication server stores this data and uses it subsequently as reference message metadata.

In subsequent authentication of the device, the device authentication server sends a device key challenge to the device. The device key challenge specifies a randomized selection of device attribute parts to be collected from the device and the manner in which the device attribute parts are to be combined to form a device key. The device key is data that identifies and authenticates the device and includes a device identifier and message metadata.

The device authentication server authenticates the device when the device identifier of the device key identifies the device and the message metadata is consistent with the reference message metadata.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

DETAILED DESCRIPTION

Figure 1:
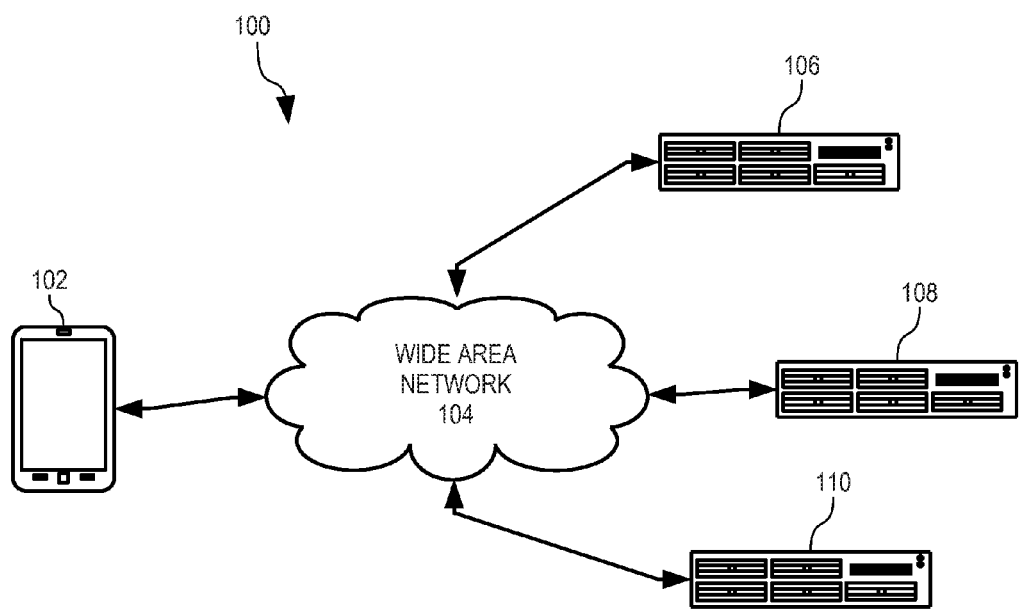
FIG. 1 is a diagram showing a computing device, a server, a device authentication server, and a social networking server that cooperate to identify and authenticate the device in accordance with one embodiment of the present invention.

In accordance with the present invention, a device authentication server 108 (FIG. 1) authenticates a computing device 102 using unique data of the user of device 102 that is stored by another server 110. In effect, device authentication server 108 leverages from an established relationship between device 102 and server 110 to more uniquely identify device 102. Server 106 is a server that requires authentication by device authentication server 108 as a precondition for receiving services from server 106.

The relationship between device 102 and server 110 that device authentication server 108 leverages for better identification and authentication of device 102 is embodied in a social networking application 1144 (FIG. 11) in this illustrative embodiment. Social networking application 1144 is a client application for a social networking service provided by server 110. Social networking application 1144 is configured by the user to supply authentication details to server 110 automatically so that the user need not enter such details each time social networking application 1144 interacts with server 110.

In one illustrative example, server 110 implements the currently used social networking service called "Twitter." A number of inter-person messages, referred to by Twitter as "tweets", appear in association with each user's account. An inter-person message is a message composed by one person and intended to be received by one or more other persons. Since each message might not be unique among all messages processed by server 110, each message is associated with an identifier that is unique among messages processed by server 110. Since each user receives and sends a unique collection of messages, the unique message identifiers of messages associated with a user's account is, in aggregate, unique.

Currently, Twitter's social networking service includes message metadata in web pages. Examples include 'data-item-id="276764531101929123"', 'id="stream-item-tweet 276674531101929473"', 'data-feedback-key="stream_status_276764531102829473"', and 'data-tweet-id="276764531198929473"'. Herein, items of message metadata are sometimes referred to as "tags."

Device authentication system 100 (FIG. 1) includes device 102, a server 106, device authentication server 108, and a service 110 that are connected to one another through a wide area computer network 104, which is the Internet in this illustrative embodiment. Device 102 can be any of a number of types of networked computing devices, including smart phones, tablets, netbook computers, laptop computers, and desktop computers. Server 106 is a server that provides services to remotely located devices such as device 102 but that is configured to require authentication of device 102 prior to providing those services. Device authentication server 108 is a server that authenticates devices, sometimes on behalf of other computers such as server 106. Server 110 provides a social networking service to other devices, such as device 102 for example.

Device attributes are described briefly to facilitate understanding and appreciation of the present invention. In this illustrative embodiment, tags associated with the user of device 102 are combined with other attributes of device 102 to form a digital fingerprint of device 102. Such other attributes include hardware and system configuration attributes of device 102 that make up an internal state of device 102. Known device record 500 (FIG. 5) includes device attributes 504, both of which are described in greater detail below. Each device attribute 504 includes an identifier 506 and a value 508. Other than tags, examples of device attributes of device 102 include a serial number of a storage device within device 102 and detailed version information regarding an operating system executing within device 102. In the example of a serial number of a storage device, identifier 506 specifies the serial number of a given storage device (such as "C:" or "/dev/sdal") as the particular information to be stored as value 508, and value 508 stores the serial number of the given storage device of device 102.

In the example of tags, value 508 will be in the form of tag log 400 (FIG. 4) that is described in greater detail below in the context of registration of device 102 for subsequent authentication.

Figure 2:
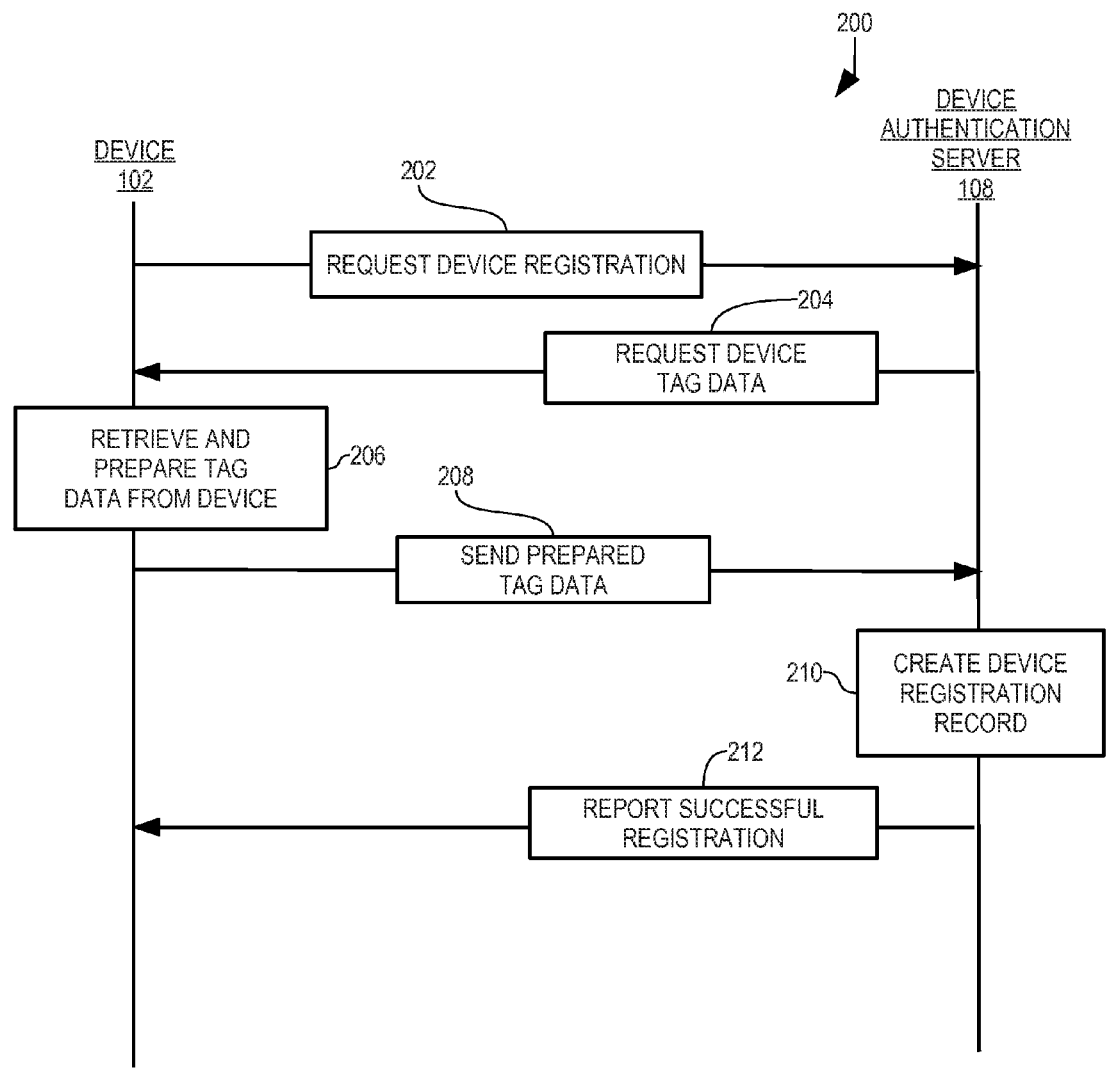
FIG. 2 is a transaction flow diagram illustrating the manner in which the device is registered with the device authentication server for subsequent authentication.

For subsequent authentication of device 102, registration in the manner illustrated in transaction flow diagram 200 (FIG. 2) retrieves tag data from device 102.

In step 202, device 102 sends a request for registration to device authentication server 108. The request can be in the form of a URL specified by the user of device 102 using a web browser 1120 (FIG. 11) executing in device 102 and conventional user interface techniques involving physical manipulation of user input devices 1108. Web browser 1120 and user input devices 1108 and other components of device 102 are described in greater detail below.

In step 204 (FIG. 2), device authentication server 108 sends a request to device 102 for device attributes of device 102.

The request sent to device 102 includes content that causes web browser 1120 (FIG. 11) of device 102 to gather attribute data representing hardware and other configuration attributes of device 102. In one embodiment, a web browser plug-in 1122 is installed in device 102 and, invoked by web browser 1120, processes the content of the web page to gather the attribute data in step 206. In other embodiments, the attribute data can be gathered in step 206 by other forms of logic of device 102, such as DDK generator 1140 installed in device 102. The various elements of device 102 and their interaction are described more completely below.

The content that causes web browser 1120 (FIG. 11) of device 102 to gather attribute data representing hardware and other configuration attributes of device 102 includes extraction logic 510 (FIG. 5) for each of the attributes web browser 1120 (FIG. 11) is to gather. In an alternative embodiment, DDK generator 1140 already includes extraction logic for all attributes and device 102 receives data identifying the particular attributes requested by device authentication server 108. Extraction logic 510 (FIG. 5) defines the manner in which a client device is to extract data to be stored as value 508 of device attribute 504.

Figure 7:
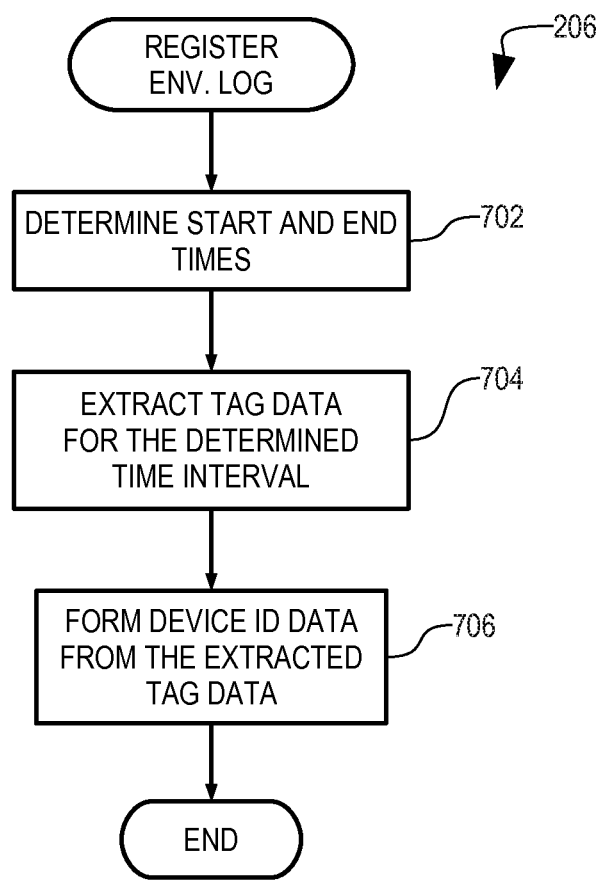
FIG. 7 is a logic flow diagram illustrating the extraction of message metadata for registration of the device.

Step 206 for gathering attribute data regarding logged environmental data is shown in greater detail as logic flow diagram 206 (FIG. 7). In step 702, device 102 determines start and end times for tag data to be collected.

In step 704 (FIG. 7), device 102 extracts the tag data for the interval of time determined in step 702. Device 102 extracts the tag data from server 110. In this illustrative embodiment, device 102 causes social networking application 1144 (FIG. 11) to retrieve all messages within the interval of time and associated with authentication data already provided to social networking application 1144. In some embodiments, web browser 1120 is configured to use previously stored authentication data to access the messages of the user of device 102 from server 110 and is used to retrieve the messages from server 110 instead of social networking application 1144.

Figure 4:
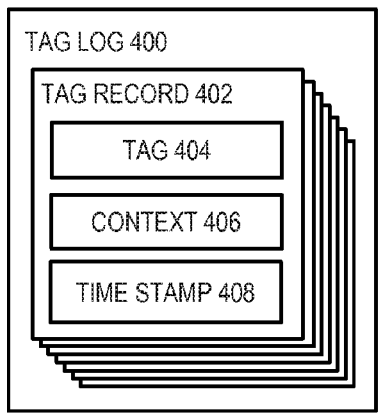
FIG. 4 is a block diagram of a log of message metadata to be used for authentication of the device of FIG. 1.
Figure 11:
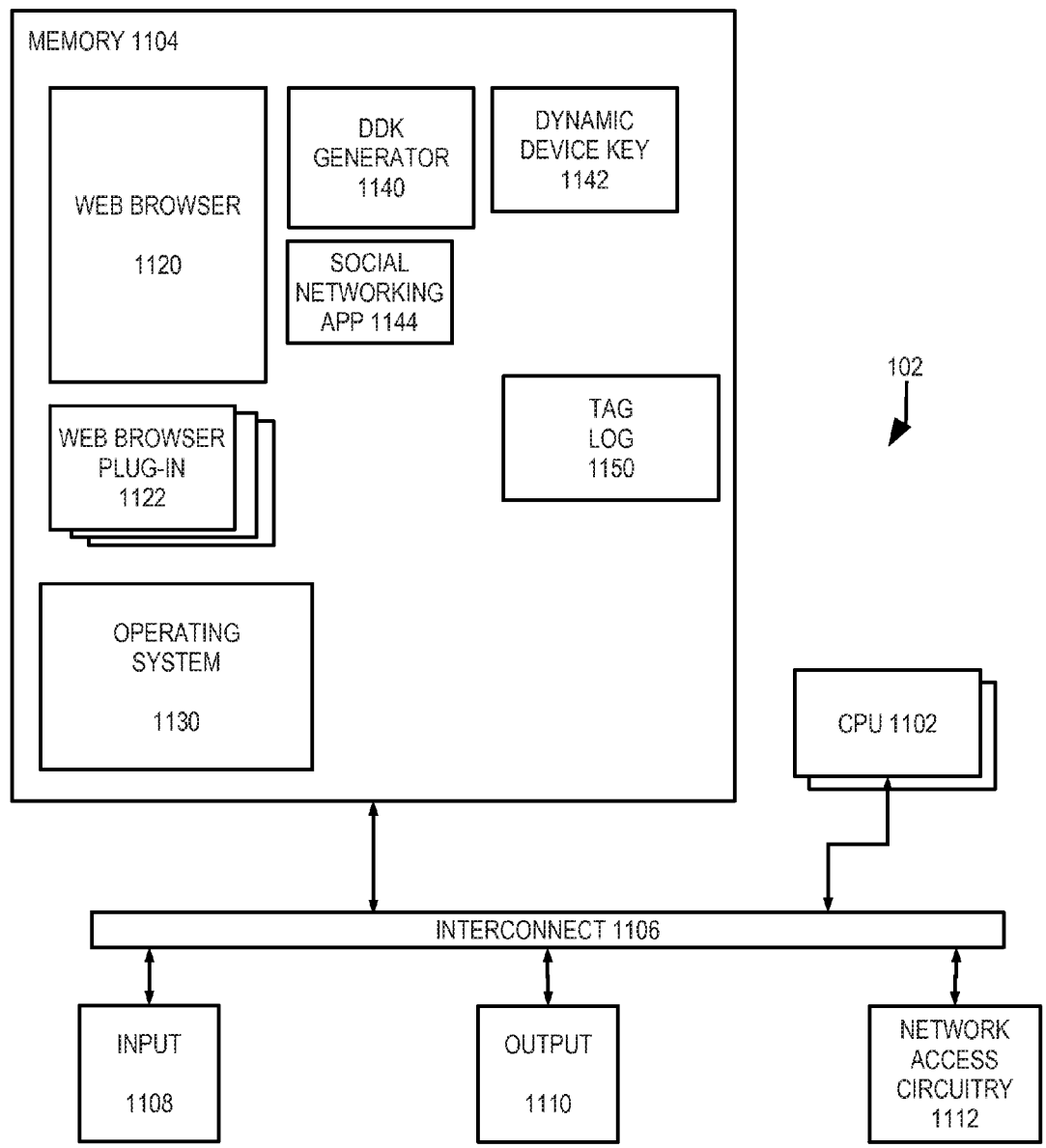
FIG. 11 is a block diagram showing in greater detail the device of FIG. 1.

Device 102 parses message metadata from the retrieved messages to form tag log 1150. Tag log 1150 is generally of the form of tag log 400 (FIG. 4). Tag log 400 includes a number of tag records 402, each representing a tag parsed from messages retrieved by social network application 1144 (FIG. 11). The particular tag represented by tag record 402 (FIG. 4) is sometimes referred to as "the subject tag" in the context of FIG. 4.

Tag 404 represents the subject tag itself. For example, if tag record 402 represents message metadata of 'data-item-id="276764531101929123"', tag 404 includes data specifying that the subject tag is "276764531101929123" or, in some embodiments, 'data-item-id="276764531101929123"'.

Context 406 specifies a context in which the subject tag appears in the message from which it was parsed. The context is any characteristic of a message or data in which the subject tag is found and that can be used to improve the uniqueness of the subject tag. For example, context 406 (FIG. 4) can specify the length of the message from which the subject tag is parsed and/or the relative position of the subject tag within the message.

Time stamp 408 specifies the date and time of the message from which the subject tag is parse. The start and end times determined by device 102 in step 702 (FIG. 7) specify which of tag records 402 (FIG. 4) are to be collected from messages. In one embodiment, device 102 determines that the start time is the very first available tag record 402 and that the end time is the current time, retrieving the entirety of all tags. In other embodiments, device 102 can determine that the start and end times represent a more limited amount of time, such as the first month of tag data available or the most recent week as examples.

In step 706 (FIG. 7), device 102 forms a device identifier from the extracted device attributes, including the tag data. The device identifier can be a hash of all, or selected parts, of collected device attributed data, for example. After step 706, processing according to logic flow diagram 206, and therefore step 206 (FIG. 2), completes.

In this illustrative embodiment, device 102—in particular, web browser plug-in 1122 (FIG. 11) or DDK generator 1140—encrypts the attribute data using a public key of device authentication server 108 and public key infrastructure (PKI), thereby encrypting the attribute data such that it can only be decrypted by device authentication server 108.

In step 208 (FIG. 2), device 102 sends the attribute data that was gathered in step 206 to device authentication server 108.

In step 210, device authentication logic 1020 (FIG. 10) of device authentication server 108 creates a device registration record for device 102 from the received attribute data. Device authentication server 108 creates a device registration record in the form of known device record 500 (FIG. 5) for device 102 by creating a globally unique identifier for device 102, or using the identifier formed by device 102 in step 706 (FIG. 7), as device identifier 502 (FIG. 5) and storing the values of the respective attributes, including the tag data, received in step 208 (FIG. 2) as value 508 (FIG. 5) in respective device attributes 504. Known device record 500 is described more completely below in greater detail.

In step 212 (FIG. 2), device authentication server 108 sends a report of successful registration to device 102, providing device identifier 502 (FIG. 5) of device 102 for subsequent identification, particularly if it differs from the one generated by device 102. After step 212 (FIG. 2), processing according to transaction flow diagram 200 completes and device 102 is registered for subsequent authentication with device authentication server 108.

Known device record 500 (FIG. 5) is a registration record and, in this illustrative example, represents registration of device 102. Known device record 500 includes a device identifier 502 and a number of device attributes 504 which are described briefly above. Each device attribute 504 includes an identifier 506 specifying a particular type of information and a value 508 representing the particular value of that type of information from device 102. For example, if identifier 506 specifies a serial number of a given storage device, value 514 stores the serial number of that storage device within device 102. Similarly, if identifier 506 specifies tags stored by device 102, value 508 stores data representing the tags themselves.

In this illustrative embodiment, value 508 stores the tag data in the form of tag log 400 (FIG. 4). In alternative embodiments, value 508 (FIG. 5) can store an abstraction of the tag data. For example, value 508 can store a hash of the tag data, e.g., a hash of all tags concatenated to one another in chronological order.

Device attribute 504 (FIG. 5) also includes extraction logic 510, comparison logic 512, alert logic 514, and adjustment logic 516. The particular device attribute represented by device attribute 504 is sometimes referred to as "the subject device attribute" in the context of FIG. 5.

Extraction logic 510 specifies the manner in which the subject device attribute is extracted by device 102. Logic flow diagram 206 (FIG. 7), described above, is an example of extraction logic 510 for tag data.

Comparison logic 512 specifies the manner in which the subject device attribute is compared to a corresponding device attribute to determine whether device attributes match one another. For example, if tag data is gathered with a specific time range, the comparison can be equivalence of the tag data received for authentication with that stored in value 508 for the specific time range. If the tag data is gathered in its entirety and represented as a cumulative collection of tags, the tag data received for authentication should represent more tags than that stored in value 508 by an amount roughly predicted by the rate of accumulation of tags over time.

Alert logic 514 can specify alerts of device matches or mismatches or other events. Examples of alert logic 514 include e-mail, SMS messages, and such to the owner of device 102 and/or to a system administrator responsible for proper functioning of device 102.

Adjustment logic 516 specifies the manner in which the subject device attribute is to be adjusted after authentication. For example, if the tag data received for authentication includes tag data that is not already stored in value 508, adjustment logic 516 can cause value 508 to be updated to include the additional tag data. Similarly, if the tag data received for authentication is a cumulative representation of the tag data, adjustment logic 516 can cause value 508 to be updated to include the newly received cumulative representation.

Device attribute 504 is shown to include the elements previously described for ease of description and illustration. However, it should be appreciated that a device attribute 504 for a given device can include only identifier 506 and value 508, while a separate device attribute specification can include extraction logic 510, comparison logic 512, alert logic 514, and adjustment logic 516. In addition, all or part of extraction logic 510, comparison logic 512, alert logic 514, and adjustment logic 516 can be common to attributes of a given type and can therefore be defined for the given type.

Figure 3:
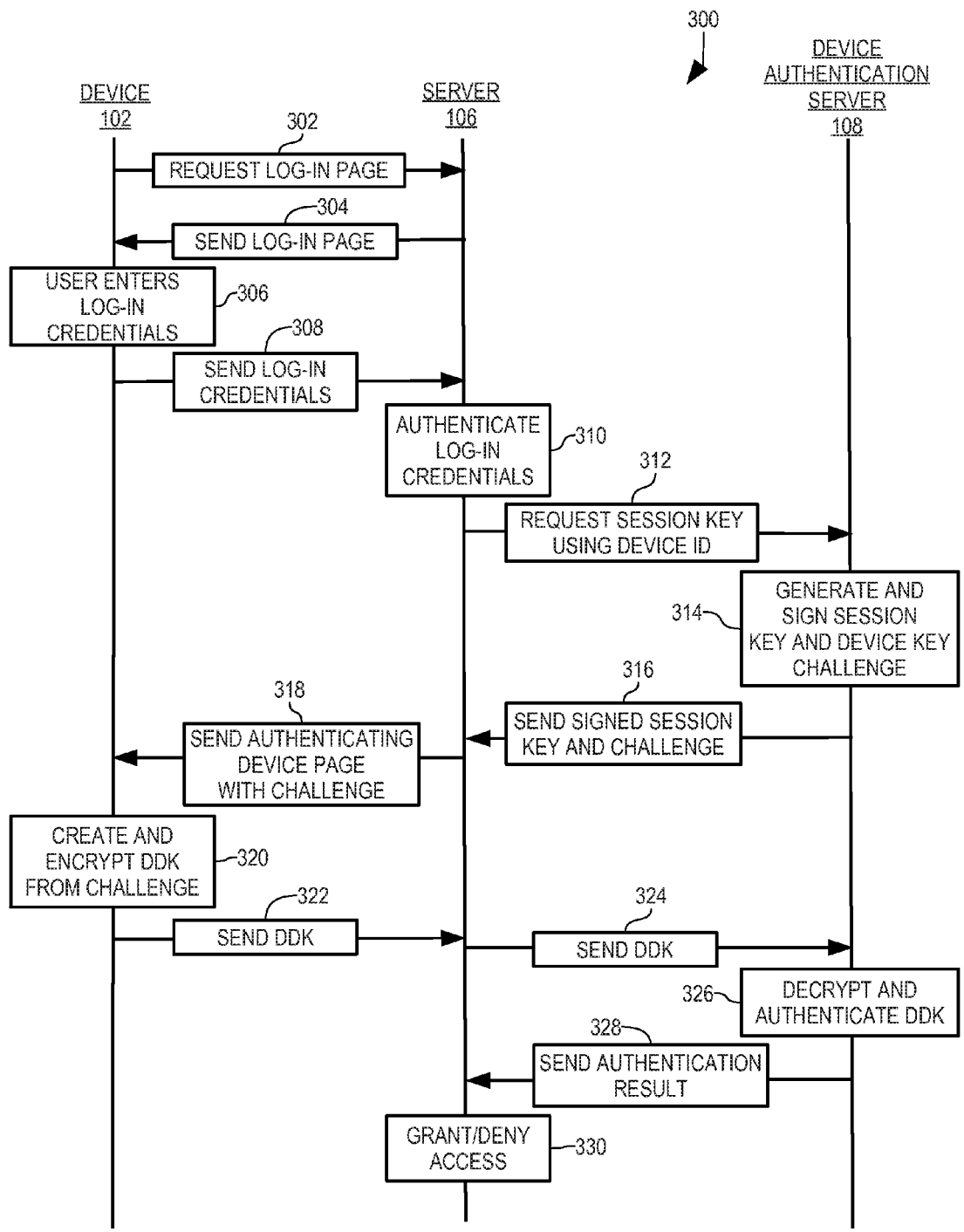
FIG. 3 is a transaction flow diagram illustrating the manner in which the device, the server, and the device authentication server of FIG. 1 cooperate to authenticate the device.

Transaction flow diagram 300 (FIG. 3) illustrates the use of device authentication server 108 to authenticate device 102 with server 106.

In step 302, device 102 sends a request for a log-in web page to server 106 by which the user can authenticate herself. The request can be in the form of a URL specified by the user of device 102 using web browser 1120 (FIG. 11) and conventional user interface techniques involving physical manipulation of user input devices 1108.

In step 304 (FIG. 3), server 106 sends the web page that is identified by the request received in step 302. In this illustrative example, the web page sent to device 102 includes content that defines a user interface by which the user of device 102 can enter her authentication credentials, such as a user name and associated password for example.

In step 306, web browser 1120 (FIG. 11) of device 102 executes the user interface and the user of device 102 enters her authentication credentials, e.g., by conventional user interface techniques involving physical manipulation of user input devices 1108. While the user is described as authenticating herself in this illustrative example, it should be appreciated that device 102 can be authenticated without also requiring that the user of device 102 is authenticated.

In step 308 (FIG. 3), device 102 sends the entered authentication credentials to server 106. In this illustrative embodiment, device 102 also sends an identifier of itself along with the authentication credentials. Server 106 authenticates the authentication credentials in step 310, e.g., by comparison to previously registered credentials of known users. If the credentials are not authenticated, processing according to transaction flow diagram 300 terminates and the user of device 102 is denied access to services provided by server 106. Conversely, if server 106 determines that the received credentials are authentic, processing according to transaction flow diagram 300 continues.

In step 312 (FIG. 3), server 106 sends a request to device authentication server 108 for a session key using the device identifier received with the authentication credentials.

In response to the request, device authentication server 108 generates and cryptographically signs a session key. Session keys and their generation are known and are not described herein. In addition, device authentication server 108 creates a device key challenge and encrypts the device key challenge using a public key of device 102 and PKI.

To create the device key challenge, device authentication server 108 retrieves the known device record 500 (FIG. 5) representing device 102 using the received device identifier and comparing it to device identifier 502. The device key challenge specifies all or part of one or more of device attribute 504 to be included in the device key and is described in greater detail below.

In step 316 (FIG. 3), device authentication server 108 sends the signed session key and the encrypted device key challenge to server 106.

In step 318, server 106 sends a "device authenticating" page to device 102 along with the device key challenge. The "device authenticating" page includes content that provides a message to the user of device 102 that authentication of device 102 is underway and content that causes device 102 to produce a dynamic device key in the manner specified by the device key challenge.

The device key challenge causes web browser 1120 (FIG. 11) of device 102 to generate a device identifier, sometimes referred to herein as a dynamic device key (DDK) for device 102, e.g., dynamic device key 1142. In one embodiment, a web browser plug-in 1122 is installed in client device 102 and, invoked by web browser 1120, processes the content of the web page to generate the DDK. In other embodiments, DDK 1142 of device 102 can be generated by other forms of logic of device 102, such as DDK generator 1140, which is a software application installed in device 102.

Figure 5:
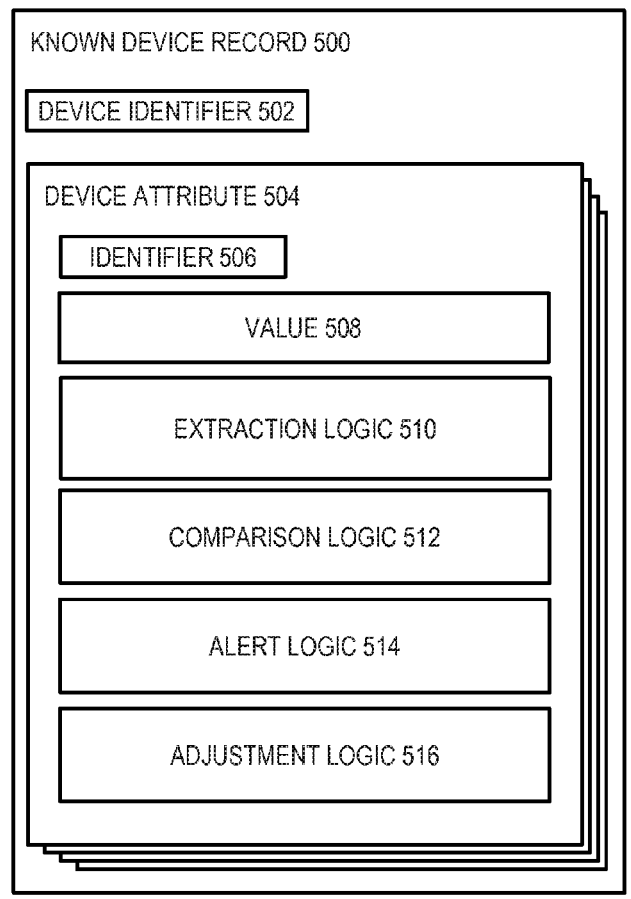
FIG. 5 is a block diagram of a known device record used by the device authentication server to authenticate the device.

The device key challenge specifies the manner in which DDK 1142 is to be generated from the attributes of device 102 represented in device attributes 504 (FIG. 5). The challenge specifies a randomized sampling of attributes of device 102, allowing the resulting DDK 1142 to change each time device 102 is authenticated. There are a few advantages to having DDK 1142 represent different samplings of the attributes of device 102. One is that any data captured in a prior authentication of device 102 cannot be used to spoof authentication of device 102 using a different device when the challenge has changed. Another is that, since only a small portion of the attributes of device 102 are used for authentication at any time, the full set of attributes of device 102 cannot be determined from one, a few, several, or even many authentications of device 102.

The device key challenge specifies items of information to be collected from hardware and system configuration attributes of device 102 and the manner in which those items of information are to be combined to form DDK 1142. In this embodiment, the challenge specifies one or more attributes related to tag data associated with device 102 within server 110, e.g., cached as tag log 1150 or retrieved anew from server 110.

The device key challenge can specify multiple parts of a device attribute to include in the device key. For example, the device key challenge can specify that the tags associated with device 102 associated with the month of February and the first quarter of the year (including February twice) are to be collected from tag log 1150 or server 110 and included in the device key.

To provide greater security, DDK 1142 includes data representing the tag data obfuscated using a nonce included in the challenge. While use of randomized parts of the tag data precludes capture of any single DDK to be used in subsequent authentication, use of the nonce thwarts collection of randomized parts of the tag data over time to recreate enough of tag log 400 (FIG. 4) to spoof authentication in response to a given challenge.

Figure 8:
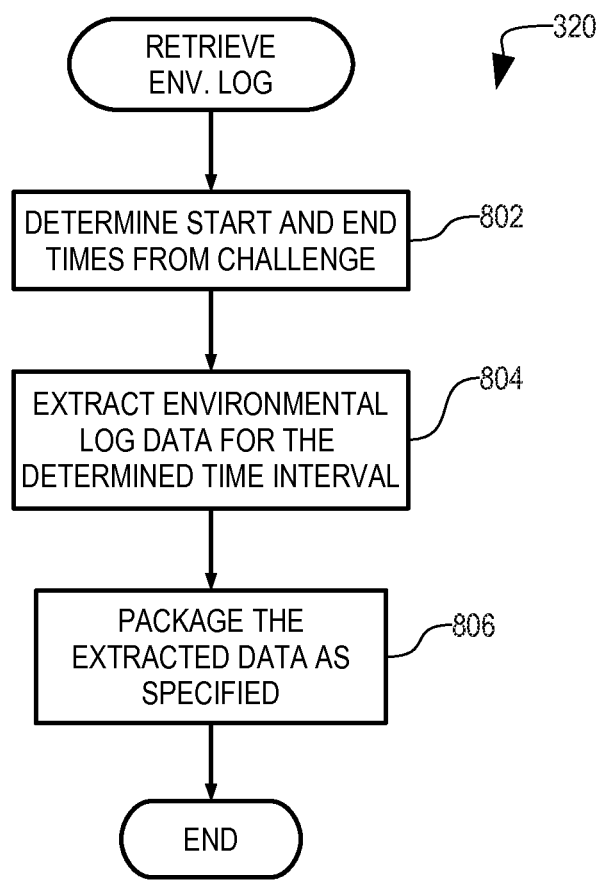
FIG. 8 is a logic flow diagram illustrating the extraction of message metadata in response to a device key challenge for authentication of the device.

In step 320 (FIG. 3), device 102 gathers tag data for inclusion in the DDK according to the device key challenge. Step 320 is shown in greater detail as logic flow diagram 320 (FIG. 8).

In step 802, device 102 determines start and end times for tag data to be collected. The start and end times are specified in the device key challenge and the device key challenge can include multiple start/end time pairs.

In step 804 (FIG. 8), device 102 extracts the tag data for the one or more intervals of time determined in step 802. Device 102 can extract the tag data from server 110 in the manner described above or, alternatively, can extract the tag data cached in tag log 1150 (FIG. 11).

In step 806 (FIG. 8), device 102 packages the extracted tag data in the manner specified in the device key challenge. As noted above, the device key challenge can specify that the an abstraction of the extracted tag data, such as a hash of the extracted tag data for example. After step 806, processing according to logic flow diagram 320, and therefore step 320 (FIG. 3), completes.

Once DDK 1142 (FIG. 11) is generated according to the received device key challenge, device 102 encrypts DDK 1142 using a public key of device authentication server 108 and PKI.

In step 322 (FIG. 3), device 102 sends the encrypted dynamic device key to server 106, and server 106 sends the encrypted dynamic device key to device authentication server 108 in step 324.

In step 326, device authentication logic 1020 of device authentication server 108 decrypts and authenticates the received DDK. Step 326 is shown in greater detail as logic flow diagram 326 (FIG. 6).

In step 602, device authentication logic 1020 identifies device 102. In this illustrative embodiment, the received DDK includes a device identifier corresponding to device identifier 502 (FIG. 5). Device authentication logic 1020 identifies device 102 by locating a known device record 500 in which device identifier 502 matches the device identifier of the received DDK.

In test step 604 (FIG. 6), device authentication logic 1020 determines whether device 102 is identified. In particular, device authentication logic 1020 determines whether a known device record with a device identifier matching the device identifier of the received DDK is successfully found in known device data 1030. If so, processing transfers to step 606. Otherwise, processing transfers to step 616, which is described below.

Figure 6:
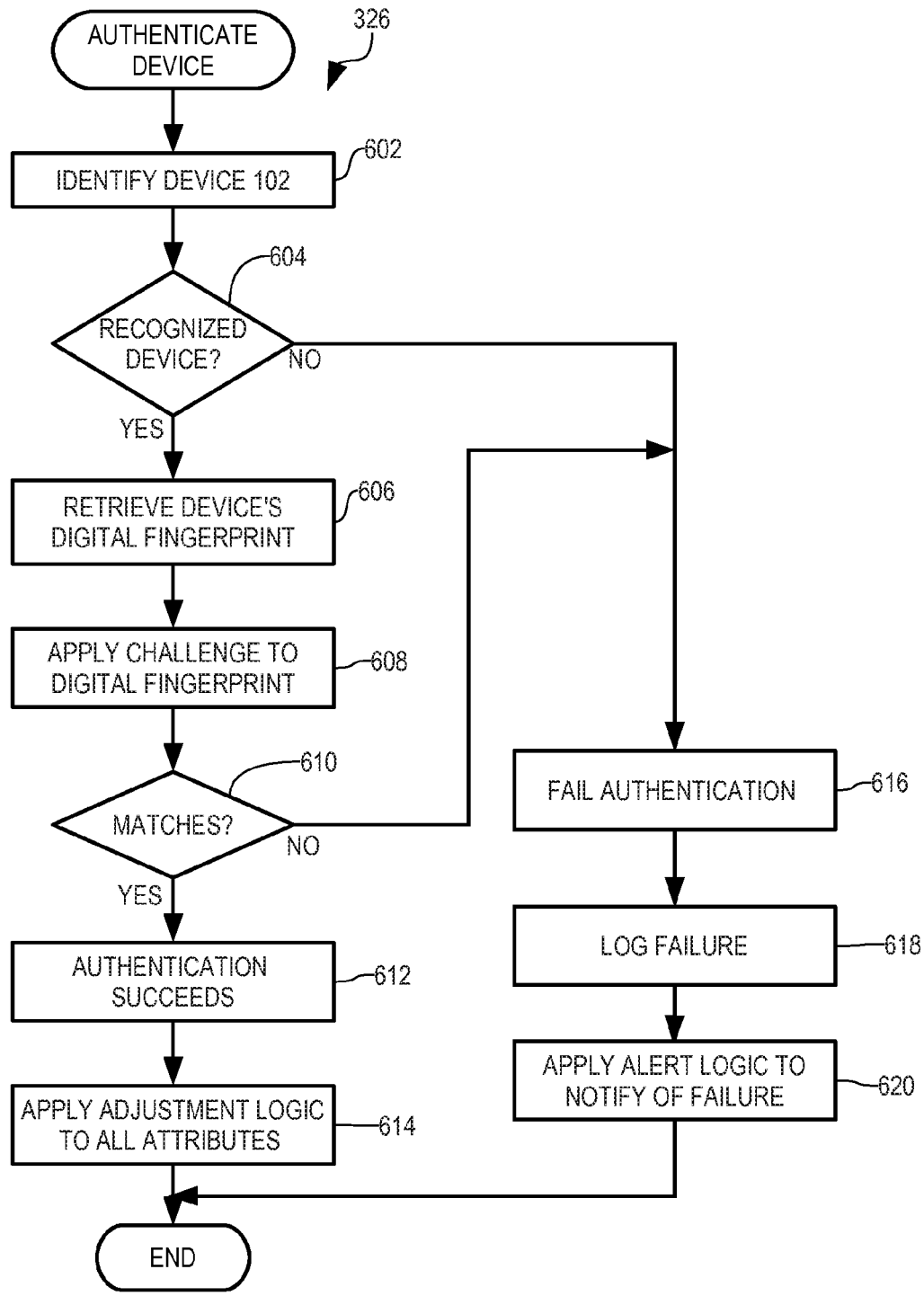
FIG. 6 is a logic flow diagram of an authentication process by which the device authentication server authenticates the device.

In step 606, device authentication logic 1020 retrieves the known device record 500 (FIG. 5) for the identified device, e.g., device 102, using the identifier determined in step 602 (FIG. 6).

In step 608, device authentication logic 1020 authenticates the received DDK using the retrieved device record 500 (FIG. 5). Device authentication logic 1020 authenticates by applying the same device key challenge sent in step 318 (FIG. 3) to the known device record 500 (FIG. 5) that corresponds to the identified device. In this illustrative embodiment, the device key challenge produces a DDK in which a portion of the DDK generated from non-interactive attributes can be parsed from a portion generated from interactive attributes, such that device 102 can be authenticated separately from the user of device 102.

In test step 610 (FIG. 6), device authentication logic 1020 determines whether the received DDK authenticates device 102 by comparing the resulting DDK of step 608 to the received DDK. In this illustrative embodiment, device authentication logic 1020 uses comparison logic 512 (FIG. 5) for each of the device attributes 504 included in the device key challenge.

If the received DDK does not authenticate device 102, processing transfers to step 616 and authentication fails or, alternatively, to step 314 (FIG. 3) in which device authentication logic 1020 sends another device key challenge to re-attempt authentication. If the received DDK authenticates device 102, processing transfers to step 612.

In step 612, device authentication logic 1020 determines that device 102 is successfully authenticated.

In step 614 (FIG. 6), device authentication logic 1020 applies adjustment logic 516 (FIG. 5) of each of device attributes 504 uses to generate the received DDK. For example, adjustment logic 516 can specify that, if the received DDK includes tag data not already included in value 508, device authentication logic 1020 incorporates the new tag data into value 508. After step 614 (FIG. 6), processing according to logic flow diagram 326, and therefore step 326, completes. As described above, authentication failure at either of test steps 604 and 610 transfers processing to step 616.

In step 616, device authentication logic 1020 determines that device 102 is not authentic, i.e., that authentication according to logic flow diagram 326 fails.

In step 618, device authentication logic 1020 logs the failed authentication and, in step 620, applies alert logic 514 (FIG. 5) to notify various entities of the failed authentication. After step 620 (FIG. 6), processing according to logic flow diagram 326, and therefore step 326, completes.

In step 328 (FIG. 3), device authentication server 108 sends data representing the result of authentication of device 102 to server 106.

In step 330, server 106 determines whether to continue to interact with device 102 and in what manner according to the device authentication results received in step 328.

Figure 9:
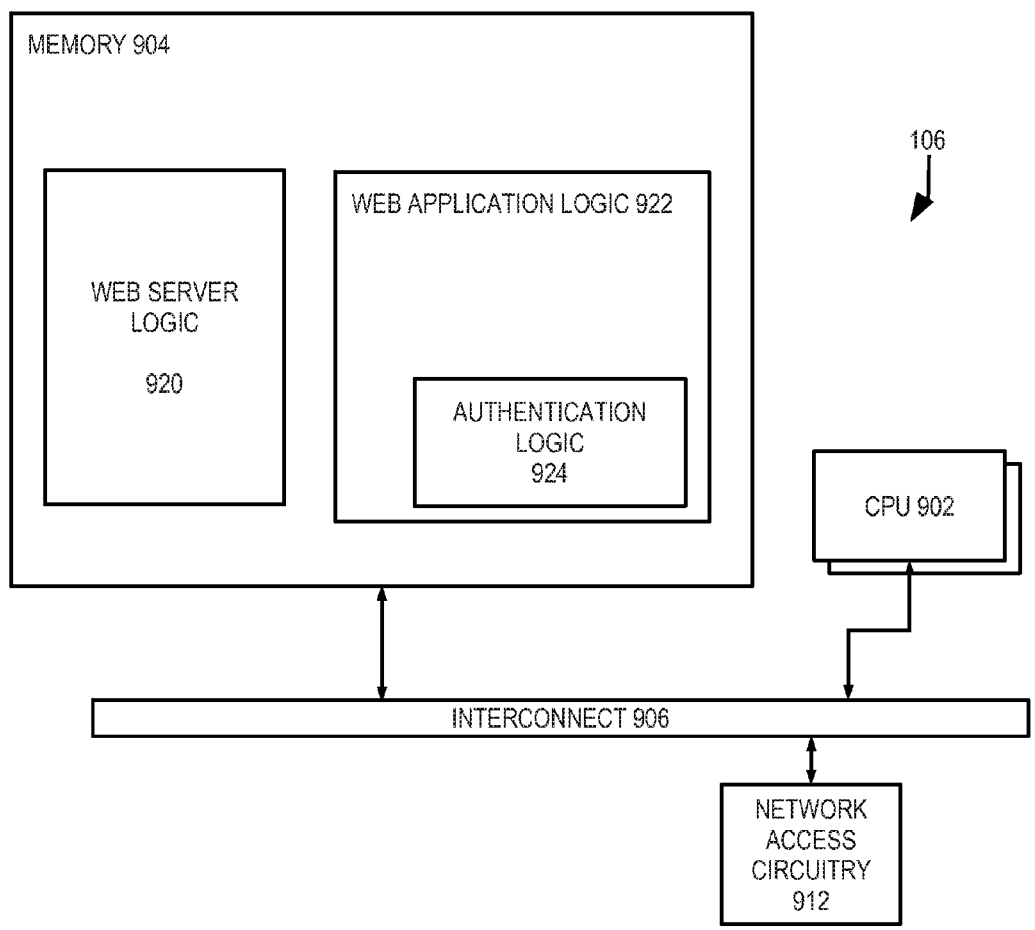
FIG. 9 is a block diagram showing in greater detail the server of FIG. 1.

Server computer 106 is shown in greater detail in FIG. 9. Server 106 includes one or more microprocessors 902 (collectively referred to as CPU 902) that retrieve data and/or instructions from memory 904 and execute retrieved instructions in a conventional manner. Memory 904 can include generally any computer-readable medium including, for example, persistent memory such as magnetic and/or optical disks, ROM, and PROM and volatile memory such as RAM.

CPU 902 and memory 904 are connected to one another through a conventional interconnect 906, which is a bus in this illustrative embodiment and which connects CPU 902 and memory 904 to network access circuitry 912. Network access circuitry 912 sends and receives data through computer networks such as wide area network 104 (FIG. 1).

A number of components of server 106 are stored in memory 904. In particular, web server logic 920 and web application logic 922, including authentication logic 924, are all or part of one or more computer processes executing within CPU 902 from memory 904 in this illustrative embodiment but can also be implemented using digital logic circuitry.

Web server logic 920 is a conventional web server. Web application logic 922 is content that defines one or more pages of a web site and is served by web server logic 920 to client devices such as device 102. Authentication logic 924 is a part of web application logic 922 that carries out device authentication in the manner described above.

Figure 10:
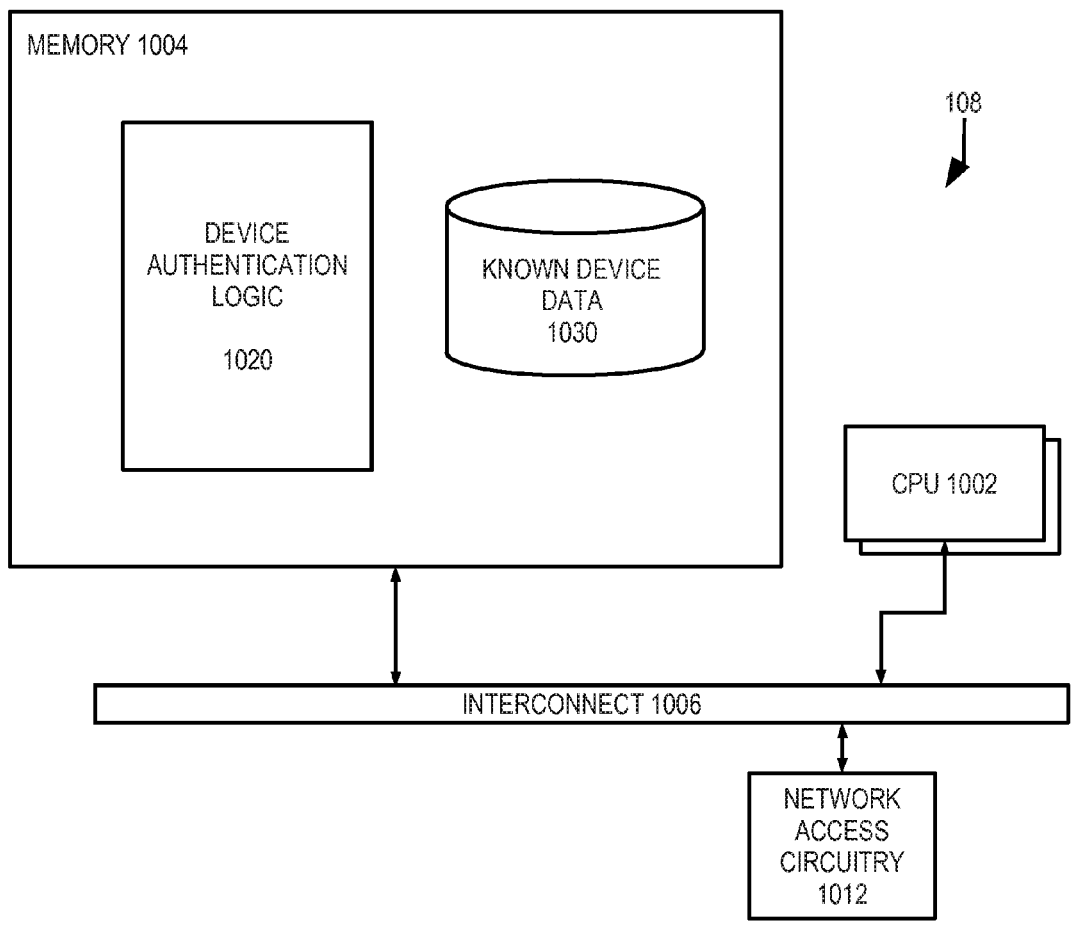
FIG. 10 is a block diagram showing in greater detail the device authentication server of FIG. 1.

Device authentication server 108 is shown in greater detail in FIG. 10. Device authentication server 108 includes one or more microprocessors 1002 (collectively referred to as CPU 1002), memory 1004, a conventional interconnect 1006, and network access circuitry 1012, which are directly analogous to CPU 902 (FIG. 9), memory 904, conventional interconnect 906, and network access circuitry 912, respectively.

A number of components of device authentication server 108 (FIG. 10) are stored in memory 1004. In particular, device authentication logic 1020 is all or part of one or more computer processes executing within CPU 1002 from memory 1004 in this illustrative embodiment but can also be implemented using digital logic circuitry. Known device data 1030 is data stored persistently in memory 1004 and includes known device records such as known device record 500 (FIG. 5) for all devices that can be authenticated by device authentication logic 1020. In this illustrative embodiment, known device data 1030 is organized as all or part of one or more databases.

Device 102 is a personal computing device and is shown in greater detail in FIG. 11. Device 102 includes one or more microprocessors 1102 (collectively referred to as CPU 1102) that retrieve data and/or instructions from memory 1104 and execute retrieved instructions in a conventional manner. Memory 1104 can include generally any computer-readable medium including, for example, persistent memory such as magnetic and/or optical disks, ROM, and PROM and volatile memory such as RAM.

CPU 1102 and memory 1104 are connected to one another through a conventional interconnect 1106, which is a bus in this illustrative embodiment and which connects CPU 1102 and memory 1104 to one or more input devices 1108, output devices 1110, and network access circuitry 1112. Input devices 1108 can include, for example, a keyboard, a keypad, a touch-sensitive screen, a mouse, a microphone, and one or more cameras. Input devices 1108 detect physical manipulation by a human user and, in response to such physical manipulation, generates signals representative of the physical manipulation and sends the signals to CPU 1102. Output devices 1110 can include, for example, a display—such as a liquid crystal display (LCD)—and one or more loudspeakers. Network access circuitry 1112 sends and receives data through computer networks such as wide area network 104 (FIG. 1).

A number of components of device 102 are stored in memory 1104. In particular, web browser 1120, operating system 1130, DDK generator 1140, and social networking application 1144 are each all or part of one or more computer processes executing within CPU 1102 from memory 1104 in this illustrative embodiment but can also be implemented using digital logic circuitry. As used herein, "logic" refers to (i) logic implemented as computer instructions and/or data within one or more computer processes and/or (ii) logic implemented in electronic circuitry.

Web browser plug-ins 1122 are each all or part of one or more computer processes that cooperate with web browser 1120 to augment the behavior of web browser 1120. The manner in which behavior of a web browser is augmented by web browser plug-ins is conventional and known and is not described herein.

Operating system 1130 is a set of programs that manage computer hardware resources and provide common services for application software such as web browser 1120, web browser plug-ins 1122, and DDK generator 1140.

DDK generator 1140 facilitates authentication of device 102 in the manner described above.

Social networking application 1144 is a client application for a network-implemented social networking service.

Tag log 1150 is data stored persistently in memory 1104 and each can be organized as all or part of one or more databases. Tag log 1150 is generally of the structure of tag log 400 (FIG. 4).

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A method for identifying a remotely located device, the method comprising:
receiving device identification data from the device, wherein the device identification data includes: a device identifier, wherein the device identifier is a unique identifier of one of a number of known devices; and message metadata, wherein the message metadata represents one or more metadata of one or more inter-person messages associated with the device, wherein the one or more inter-person message is a message composed by one person and intended to be received by one or more other persons; determining that the device identifier identifies the device; determining that the message metadata is consistent with corresponding reference message metadata previously stored for the device; and authenticating the device as a recognized device upon determining that the message metadata is consistent with the corresponding reference message metadata.

2. The method of claim 1 wherein the message metadata is retrieved by the remotely located device from a remotely located server that provides a social networking service.

3. The method of claim 1 wherein the device identification data also includes internal state data that represents one or more attributes of an internal state of the device; and wherein authenticating the device as the recognized device is performed in response to also determining that the internal state data is consistent with previously stored reference internal state data for the device.

4. The method of claim 1 further comprising:
sending challenge data to the device, wherein the challenge data specifies the manner in which the device is to gather and form the device identification data, including the message metadata.

5. The method of claim 1 further comprising:
in response to authenticating the device as the recognized device, adjusting the reference message metadata in accordance with the message metadata.

6. A non-transitory computer readable medium useful in association with a computer that includes one or more processors and a memory, the computer readable medium including computer instructions that are configured to cause the computer, by execution of the computer instructions in the one or more processors from the memory, to identify a remotely located device by at least: receiving device identification data from the device, wherein the device identification data includes:
a device identifier, wherein the device identifier is a unique identifier of one of a number of known devices; and message metadata, wherein the message metadata represents one or more metadata of one or more inter-person messages associated with the device, wherein the one or more inter-person message is a message composed by one person and intended to be received by one or more other persons; determining that the device identifier identifies the device; determining that the message metadata is consistent with corresponding reference message metadata previously stored for the device; and authenticating the device as a recognized device upon determining that the message metadata is consistent with the corresponding reference message metadata.

7. The computer readable medium of claim 6 wherein the message metadata is retrieved by the remotely located device from a remotely located server that provides a social networking service.

8. The computer readable medium of claim 6 wherein the device identification data also includes internal state data that represents one or more attributes of an internal state of the device; and
wherein authenticating the device as the recognized device is performed in response to also determining that the internal state data is consistent with previously stored reference internal state data for the device.

9. The computer readable medium of claim 6 wherein the computer instructions are configured to cause the computer to identify a remotely located device by at least also:
sending challenge data to the device, wherein the challenge data specifies the manner in which the device is to gather and form the device identification data, including the message metadata.

10. The computer readable medium of claim 6 wherein the computer instructions are configured to cause the computer to identify a remotely located device by at least also:
in response to authenticating the device as the recognized device, adjusting the reference message metadata in accordance with the message metadata.

11. A computer system comprising: at least one processor; a computer readable medium that is operatively coupled to the processor; network access circuitry that is operatively coupled to the processor; and
device identification logic (i) that executes at least in part in the processor from the computer readable medium and (ii) that, when executed, causes the processor to identify a remotely located device by at least: receiving device identification data from the device, wherein the device identification data includes: a device identifier, wherein the device identifier is a unique identifier of one of a number of known devices; and
message metadata, wherein the message metadata represents one or more metadata of one or more inter-person message associated with the device, wherein the one or more inter-person message is a message composed by one person and intended to be received by one or more other persons; determining that the device identifier identifies the device; determining that the message metadata is consistent with corresponding reference message metadata previously stored for the device; and authenticating the device as a recognized device upon determining that the message metadata is consistent with the corresponding reference message metadata.

12. The computer system of claim 11 wherein the message metadata is retrieved by the remotely located device from a remotely located server that provides a social networking service.

13. The computer system of claim 11 wherein the device identification data also includes internal state data that represents one or more attributes of an internal state of the device; and
wherein authenticating the device as the recognized device is performed in response to also determining that the internal state data is consistent with previously stored reference internal state data for the device.

14. The computer system of claim 11 wherein the device identification logic is configured to cause the processor to identify a remotely located device by at least also:
sending challenge data to the device, wherein the challenge data specifies the manner in which the device is to gather and form the device identification data, including the message metadata.

15. The computer system of claim 11 wherein the device identification logic is configured to cause the processor to identify a remotely located device by at least also:
in response to authenticating the device as the recognized device, adjusting the reference message metadata in accordance with the message metadata.

* * * * *